United States Patent
Numata

(10) Patent No.: US 10,659,331 B2
(45) Date of Patent: May 19, 2020

(54) NETWORK SYSTEM, DEVICE MANAGEMENT METHOD, NETWORK DEVICE, CONTROL METHOD THEREOF, AND NON-TRANSITORY COMPUTER-READABLE MEDIUM

(71) Applicant: CANON KABUSHIKI KAISHA, Tokyo (JP)

(72) Inventor: Masahito Numata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 384 days.

(21) Appl. No.: 15/674,605

(22) Filed: Aug. 11, 2017

(65) Prior Publication Data

US 2018/0062961 A1 Mar. 1, 2018

(30) Foreign Application Priority Data

Aug. 29, 2016 (JP) ................. 2016-167288

(51) Int. Cl.
*H04L 12/16* (2006.01)
*H04L 12/26* (2006.01)
*H04L 29/06* (2006.01)
*H04L 12/24* (2006.01)
*H04L 29/08* (2006.01)

(52) U.S. Cl.
CPC .......... *H04L 43/0817* (2013.01); *H04L 67/42* (2013.01); *H04L 41/0853* (2013.01); *H04L 41/28* (2013.01); *H04L 67/10* (2013.01)

(58) Field of Classification Search
CPC ..... H04L 43/0817; H04L 67/42; H04L 67/10; H04L 41/28; H04L 41/0853; H04L 63/0869; H04L 63/123; H04L 63/061; H04L 9/14; H04L 9/321; H04L 9/3247; H04L 9/0861; H04L 9/32
See application file for complete search history.

(56) References Cited

U.S. PATENT DOCUMENTS 8,463,898 B2 6/2013 Sakai
8,613,070 B1 * 12/2013 Borzycki ............ G06F 21/6218
726/8

(Continued)

FOREIGN PATENT DOCUMENTS

CN 103595720 A * 2/2014
JP 2009-276999 A 11/2009

*Primary Examiner* — Oanh Duong
(74) *Attorney, Agent, or Firm* — Venable LLP

(57) ABSTRACT

A network device in a network system which includes a plurality of network devices and a management system managing information collected from the plurality of network devices, the network devices comprising, a memory storing instructions; and a processor which is capable of executing the instructions causing the network device to: receive, from the management system, token information for another network device which is managed in the management system in the same management group as the network device; try communication with the another network device by using the received token information; and send information regarding the communication to the management system, wherein the token information is sent from a management application executed by the another network device to the management system, before a detection of an abnormality in the another network device by the management system.

16 Claims, 13 Drawing Sheets

(56) References Cited

U.S. PATENT DOCUMENTS

| | | | |
|---|---|---|---|
| 9,264,413 B2* | 2/2016 | Zhang | H04L 63/08 |
| 2009/0285115 A1 | 11/2009 | Sakai | |
| 2012/0066558 A1* | 3/2012 | Duchenay | H04L 41/064 |
| | | | 714/57 |
| 2014/0157392 A1* | 6/2014 | Smith | H04L 63/08 |
| | | | 726/9 |
| 2015/0227749 A1* | 8/2015 | Schincariol | H04L 67/1097 |
| | | | 726/28 |
| 2016/0366105 A1* | 12/2016 | Smith | H04L 63/0428 |
| 2017/0094078 A1* | 3/2017 | Ohara | H04N 1/00344 |
| 2017/0202046 A1* | 7/2017 | Lee | H04W 4/08 |

\* cited by examiner

FIG. 6

| TENANT ID | MANAGEMENT APPLICATION ID | TYPE | VERSION | ACCESS TOKEN | STATUS | LAST COMMUNICATION DATE AND TIME | INSTALLATION LOCATION |
|---|---|---|---|---|---|---|---|
| 1111AA | 19e074c4-bc22 | Device | 2.0.0 | cc87d5f0-29ef | NORMAL | 2016/6/15 14:45:30 | HEAD OFFICE |
| 1111AA | 59f88515-999d | Device | 2.0.0 | 7c737309-1565 | ABNORMAL | 2016/6/8 7:45:30 | HEAD OFFICE |
| 1111AA | 1f3d5183-d194 | Device | 1.2.0 | d4a2a94d-9d39 | NORMAL | 2016/6/15 10:12:21 | HEAD OFFICE |
| 1111AA | b0d3ebe1-7a0e | Device | 1.0.0 |  | NORMAL | 2016/6/15 12:34:44 | HEAD OFFICE |
| 1111AA | a3a95ada-3e11 | Device | 2.0.0 | 32423b86-ec48 | NORMAL | 2016/6/15 15:01:00 | BRANCH |
| 2222AA | 4b2b8a82-bd1b | PC | 2.0.0 | 7238b624-10ee | NORMAL | 2016/6/15 14:49:10 | SUBBRANCH A |
| 2222AA | 838b68b7-27a9 | Device | 2.0.0 | 54adda58-5c8e | NORMAL | 2016/6/15 8:24:54 | SUBBRANCH B |

601 602 603 604 605 606 607 608

NETWORK SYSTEM, DEVICE MANAGEMENT METHOD, NETWORK DEVICE, CONTROL METHOD THEREOF, AND NON-TRANSITORY COMPUTER-READABLE MEDIUM

BACKGROUND OF THE INVENTION

Field of the Invention

The present invention relates to a network system, a device management method, a network device, a control method thereof, and a non-transitory computer-readable medium.

Description of the Related Art

In recent years, a device management service which performs, for example, device management, failure restoration, management of print status of a customer device (a copying machine, a printer, or the like) has been provided as a cloud service in a server on the Internet. In the device management service, a device is managed for a customer or a predetermined group, and device information regarding device usage such as device information or the actual numbers of print is sent/received between a device in a customer environment and the server on the Internet. At this time, a firewall is generally set in the customer environment, making it impossible to collect the device information directly from a server side on the Internet to the device in the customer environment. To cope with this, an arrangement is adopted in which a device management application is arranged in the customer environment, and the device management application collects the device information from the device in the customer environment and sends it to the server on the Internet. However, if the device management application arranged in the customer environment cannot communicate with the server for some reason, the server side never knows that reason.

Japanese Patent Laid-Open No. 2009-276999 discloses a technique of, if an information collection apparatus which collects network device information cannot continue collection, handing over collection processing to another device which has an information collection function in a network.

In Japanese Patent Laid-Open No. 2009-276999, however, the information collection apparatus performs handover processing after deciding a handover destination, making it impossible to hand over information collection processing if the information collection apparatus itself cannot continue operation suddenly due to a fault, a failure, or the like.

SUMMARY OF THE INVENTION

The present invention has been made in order to solve the above-described problems, and allows a device management server on the Internet to detect an abnormality in a device management application and collect information on the application securely even at the time of sudden abnormality.

According to one aspect of the present invention, there is provided a network system comprising a plurality of network devices, and a management system configured to manage information collected from the plurality of network devices, wherein a management application executed by each of the plurality of network devices sends token information to the management system, wherein the management system includes a first memory storing first instructions; and a first processor which is capable of executing the first instructions causing the management system to: manage the plurality of network devices in association with each other for one management group by using one of the network devices and identification information of the management applications operating in the network devices; receive token information from the network devices; register the received token information, and at least one of the network devices and the identification information of the management applications operating in the network devices in association with each other; and when an abnormality in communication with a first network device out of the plurality of network devices is detected, send the registered token information that has been received from the first network device to a second network device managed in association with the same management group as the first network device; wherein the second network device includes a second memory storing second instructions; and a second processor which is capable of executing the second instructions causing the second network device to: try communication with the first network device by using the token information sent from the management system; and send information regarding the communication to the management system.

According to another aspect of the present invention, there is provided a device management method in a network system which includes a plurality of network devices, and a management system configured to manage information collected from the plurality of network devices, wherein a management application executed by each of the plurality of network devices sends token information to the management system, wherein in the management system, the plurality of network devices are managed in association with each other for one management group by using one of the network devices and identification information of the management applications operating in the network devices; token information is received from the network devices; the received token information, and at least one of the network devices and the identification information of the management applications operating in the network devices are registered in association with each other; and when an abnormality in communication with a first network device out of the plurality of network devices is detected, the registered token information that has been received from the first network device is sent to a second network device managed in association with the same management group as the first network device; wherein in the second network device, communication with the first network device is tried by using the token information sent from the management system; and information regarding the communication is sent to the management system.

According to another aspect of the present invention, there is provided a network device in a network system which includes a plurality of network devices and a management system managing information collected from the plurality of network devices, the network devices comprising, a memory storing instructions; and a processor which is capable of executing the instructions causing the network device to: receive, from the management system, token information for another network device which is managed in the management system in the same management group as the network device; try communication with the another network device by using the received token information; and send information regarding the communication to the management system, wherein the token information is sent from a management application executed by the another network device to the management system, before a detection of an abnormality in the another network device by the management system.

According to another aspect of the present invention, there is provided a method of controlling a network device in a network system which includes a plurality of network devices and a management system managing information collected from the plurality of network devices, the method comprising: receiving, from the management system, token information for another network device which is managed in the management system in the same management group as the network device; trying communication with the another network device by using the received token information; and sending information regarding the communication to the management system, wherein the token information is sent from a management application executed by the another network device to the management system, before a detection of an abnormality in the another network device by the management system.

According to another aspect of the present invention, there is provided a non-transitory computer-readable medium that stores a program for causing a network device in a network system which includes a plurality of network devices and a management system managing information collected from the plurality of network devices to: receive, from the management system, token information for another network device which is managed in the management system in the same management group as the network device; try communication with the another network device by using the received token information; and send information regarding the communication to the management system, wherein the token information is sent from a management application executed by the another network device to the management system, before a detection of an abnormality in the another network device by the management system.

According to the present invention, it is possible to collect information on a device management application securely even in a case in which the device management application suddenly enters an abnormal state.

Further features of the present invention will become apparent from the following description of exemplary embodiments (with reference to the attached drawings).

BRIEF DESCRIPTION OF THE DRAWINGS

FIG. 6 is a table showing an example of a data structure according to the present invention;

DESCRIPTION OF THE EMBODIMENTS

<First Embodiment>

A mode for carrying out the present invention will be described below with reference to the accompanying drawings.

[System Arrangement]

Figure 1:
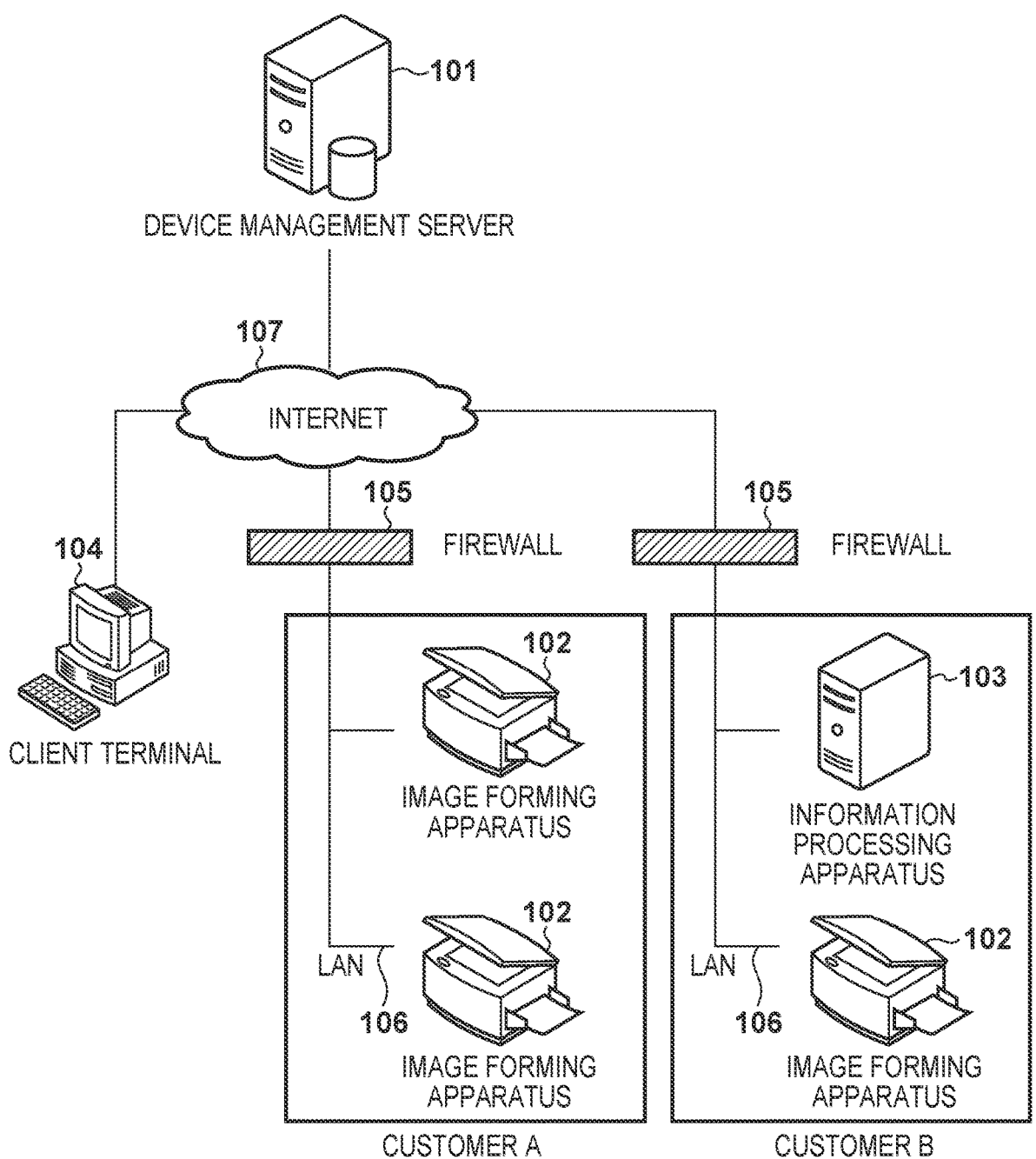
FIG. 1 is a view showing an example of the network configuration of a device management system according to the present invention.

Respective apparatuses which make up a device management system according to the first embodiment will be described with reference to FIG. 1. In FIG. 1, the device management system is configured as a network system in which a device management server 101, a client terminal 104, the internal network of a customer A, and the internal network of a customer B are connected via the Internet 107. Firewalls 105 are arranged between the Internet 107, and the respective internal networks of the customer A and customer B to restrict communication based on a predetermined rule.

The internal network of the customer A includes two image forming apparatuses 102 communicably connected via a LAN (Local Area Network) 106. The LAN 106 is connected to an external network via the firewall 105. The internal network of the customer B includes the image forming apparatus 102 and an information processing apparatus 103 communicably connected via the LAN 106. The LAN 106 is connected to the external network via the firewall 105. Note that the two customers A and B are shown as customers here. However, the present invention is not limited to this but may include the networks of more customers. Furthermore, the arrangement of the apparatuses included in the internal network of each customer is not limited to this, but the network may include more apparatuses.

In order to manage a plurality of customer devices concentratedly, the device management server 101 includes a multi-tenant architecture which separates and manages the devices logically or physically on a customer basis. That is, each customer is managed as a tenant by a multi-tenant configuration. Note that one device management server 101 is shown in FIG. 1, but an arrangement may be adopted in which a plurality of apparatuses or a plurality of virtual devices form the device management server 101 and manage respective managed apparatuses in a distributed manner.

Each image forming apparatus 102 according to this embodiment can install a management application which collects print performance log information, error information, consumable information, and the like by monitoring its own state, and sends them to the device management server 101. A single function network printer, an MFP (Multi-Function Peripheral), a scanner, or the like corresponds to the image forming apparatus. Each image forming apparatus 102 is an example of a network device connected to a network and is not limited to the image forming apparatus. Each image forming apparatus 102 may be another network device as long as it is a device that allows the device management server 101 to manage and monitor its information concentratedly.

The information processing apparatus 103 collects the print performance log information, the error information, the consumable information, and the like by monitoring the image forming apparatus 102 which does not install the management application, and sends them to the device management server 101.

In this embodiment, each image forming apparatus 102 included in the internal network of the customer A can install the management application and send its own various kinds of information to the device management server 101. In the internal network of the customer B, the information processing apparatus 103 monitors the image forming apparatus 102 which belongs to the same internal network and does not install the management application, and sends its information to the device management server 101.

The client terminal 104 accesses the device management server 101 via the Internet 107 and instructs an operation regarding device management for each customer. The client terminal 104 is not limited to a personal computer (PC) but may be a portable terminal having the same function.

[Hardware Arrangement]

Figure 2:
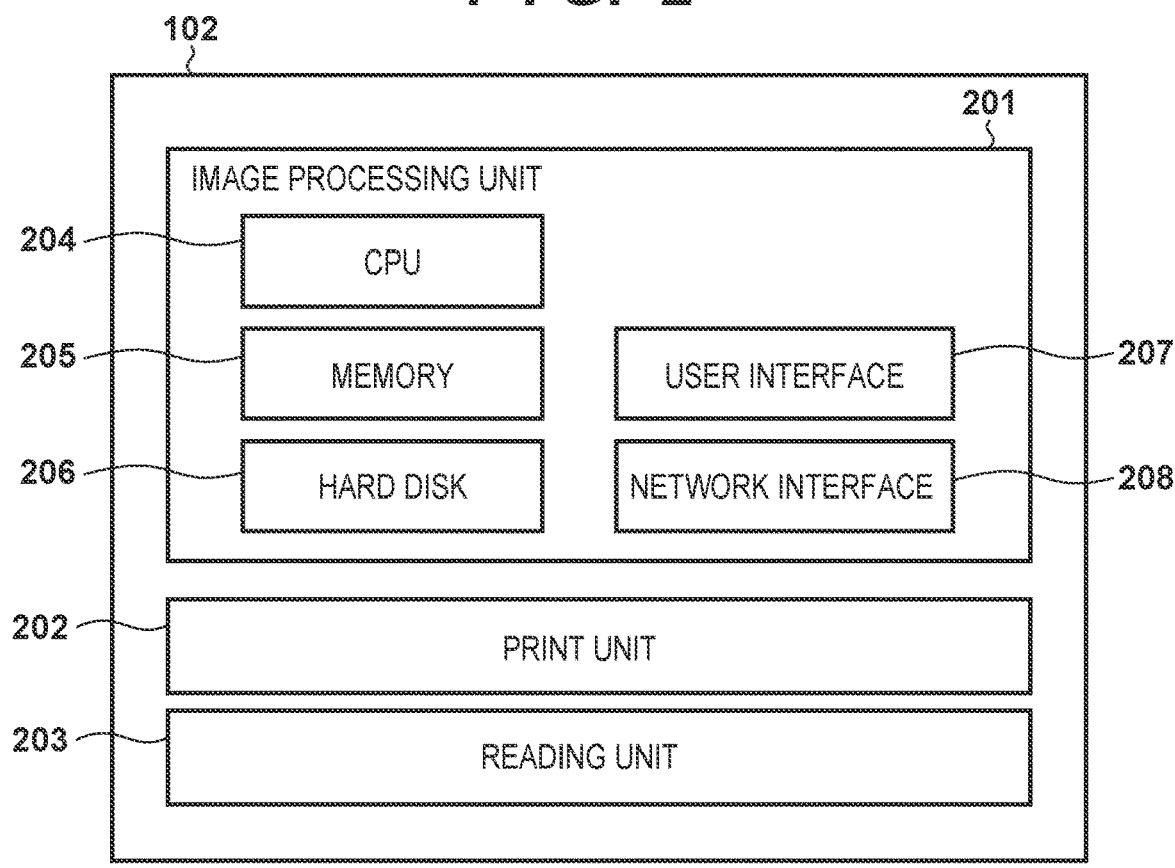
FIG. 2 is a block diagram showing an example of the hardware arrangement of an image forming apparatus according to the present invention.

FIG. 2 is a block diagram showing an example of the hardware arrangement of the image forming apparatus 102 according to this embodiment. The image forming apparatus 102 includes an image processing unit 201, a print unit 202, and a reading unit 203. If the image forming apparatus 102 is not a multifunction peripheral, an arrangement without the reading unit 203 may be possible.

The image processing unit 201 includes a CPU 204, a memory 205, a hard disk 206, and a user interface 207. The CPU 204 controls the entire image forming apparatus 102. The CPU 204 is a unit which implements various functions by reading out and executing various programs stored in a storage unit. The memory 205 is a unit which temporarily stores various kinds of information and is, for example, used when reading out programs stored in the hard disk 206 or used as the temporary work storage area of the CPU 204. The hard disk 206 is a non-volatile storage area and may be, for example, other hardware having the same function such as a flash memory.

The user interface 207 is a unit configured to accept an instruction from a user or output a screen to the user. A network interface 208 is a unit configured to connect the image forming apparatus 102 to the network, and the type such as wired connection/wireless connection is not particularly limited with regard to a method used for connection.

The print unit 202 performs a print operation (image forming operation) based on an instruction from the CPU 204. The reading unit 203 performs, based on an instruction from the CPU 204, a reading operation (scan operation) of an original or the like. Note that FIG. 2 shows an example of the representative hardware arrangement of the image forming apparatus 102 and is not limited to this arrangement. In addition to the above-described arrangement, for example, an arrangement may be adopted in which a FAX board or an external control apparatus is connected. Moreover, a unit different from the print unit 202 may be included as the managed apparatus if the present invention is applied to a network device other than the image forming apparatus.

Figure 3:
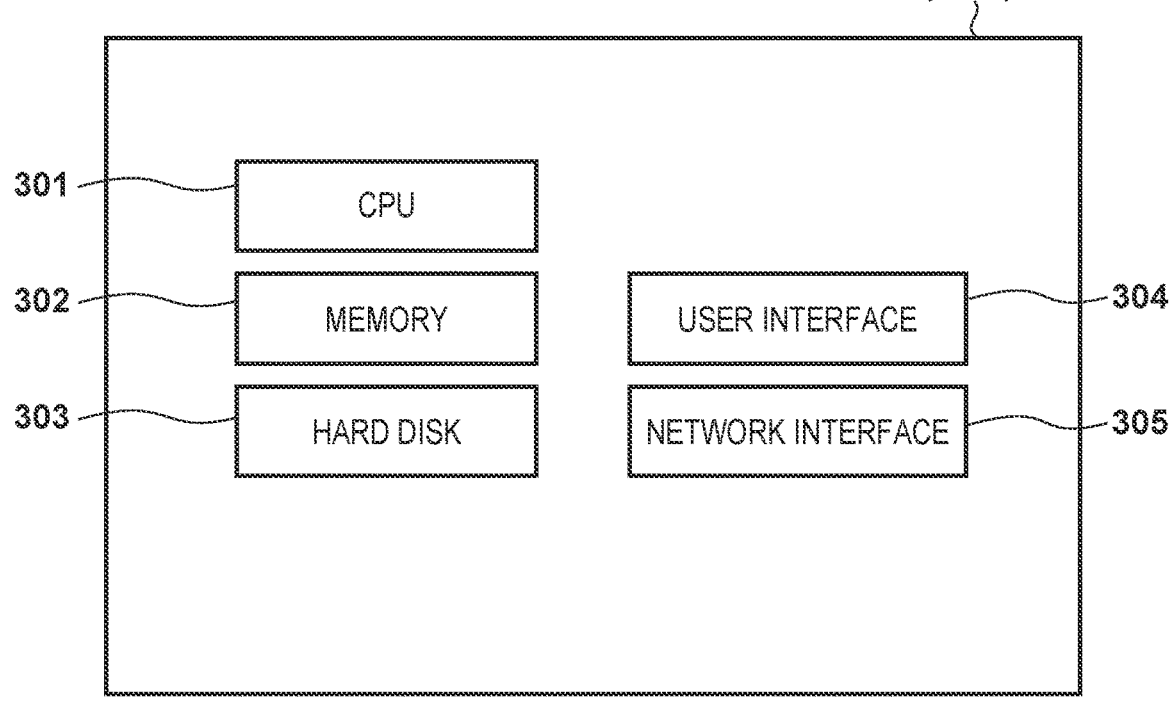
FIG. 3 is a block diagram showing an example of the hardware arrangement of an information processing apparatus according to the present invention.

FIG. 3 is a block diagram showing an example of the hardware arrangement of the device management server 101, the information processing apparatus 103, and the client terminal 104. A CPU 301 controls the entire apparatuses. The CPU 301 is a unit which implements various functions by reading out and executing the various programs stored in the storage unit. A memory 302 is a unit which temporarily stores various kinds of information and is, for example, used when reading out programs stored in a hard disk 303 or used as the temporary work storage area of the CPU 301. The hard disk 303 is a non-volatile storage area and may be, for example, other hardware having the same function such as a flash memory.

A user interface 304 is a unit configured to accept an instruction from the user or output a screen to the user. A network interface 305 is a unit configured to connect the apparatuses to the network, and the type such as wired connection/wireless connection is not particularly limited with regard to a method used for connection. Note that FIG. 3 shows an example of the representative hardware arrangement and is not limited to this arrangement. For example, an arrangement with another part of an information processing apparatus such as a general PC (Personal Computer) may be adopted.

[Software Arrangement]

(Management Application)

Figure 4:
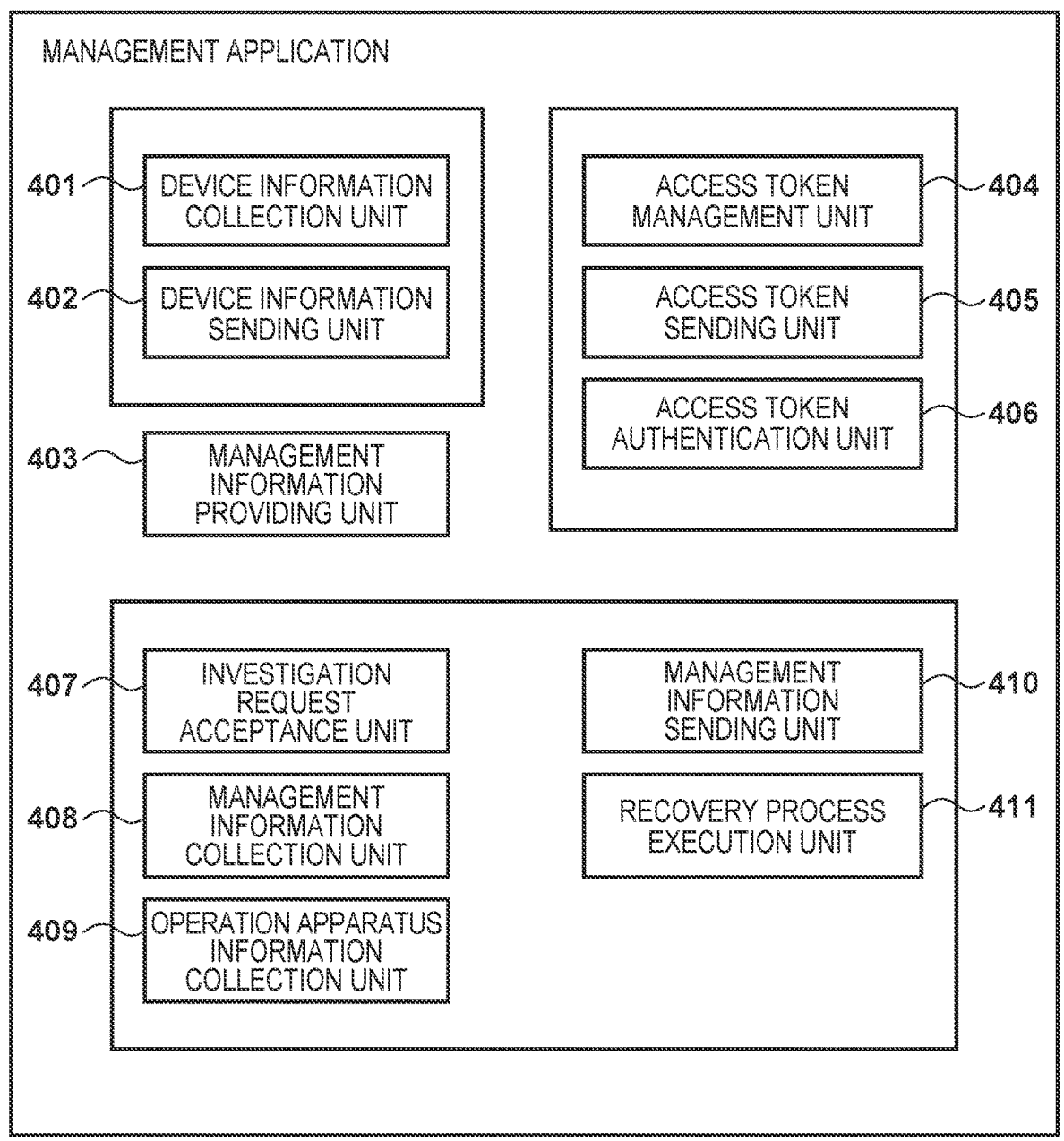
FIG. 4 is a block diagram showing an example of the software arrangement of a management application according to the first embodiment.

FIG. 4 shows an example of the software arrangement of a management application installed onto each image forming apparatus 102 or the information processing apparatus 103. Programs which implement the functions of the respective software arrangement shown in FIG. 4 are stored in the hard disks 206 and 303 of the respective apparatuses. These functions are implemented by causing the CPUs 204 and 301 to load the programs into the memories 205 and 302, and execute them.

A device information collection unit 401 accesses the image forming apparatuses 102 each serving as a managed apparatus to collect various kinds of device information (print performance log information, error information, consumable information, and the like) in using the image forming apparatuses 102. Note that the various kinds of device information are updated as the image forming apparatuses 102 are used, and held in the image forming apparatuses 102. For example, when the print performance log information is collected, the device information collection unit 401 manages the pointer of the print performance log information that has been collected from each image forming apparatus 102 and manages, with respect to the image forming apparatus 102, specific time of the print performance log information to start collecting. As a collection method, there is a collection method using an SNMP (Simple Network Management Protocol) or a protocol unique to the vendor of each image forming apparatus 102. The type of device information to be collected and the collection method are not particularly limited. The device information collection unit 401 may change the collection method in accordance with whether an apparatus onto which the management application is installed is each image forming apparatus 102 itself or the information processing apparatus 103.

A device information sending unit 402 sends the device information collected from each image forming apparatus 102 to the device management server 101. For example, when the print performance log information is collected, the device information sending unit 402 manages the pointer of the print performance log information that has been sent to the device management server 101. Then, the device information sending unit 402 manages, at a next sending timing, specific time of the print performance log information to start sending to the device management server 101. That is, the device information sending unit 402 manages a sent range and an unsent range, and sends information included in the unsent range in accordance with its sending status. If unsent information has a predetermined size or more, it may be sent dividedly over a plurality of times. As a sending method of various kinds of information, there is, for example, a method of invoking the Web API (Web Application Programming Interface) of the device management server 101. Note that the device information to be sent and the sending method are not limited to these. For example, the device information sending unit 402 may have a preset time interval or date and time to send the device information periodically, or may send the device information at a timing when a predetermined event occurs.

A management information providing unit 403 is an API (Application Programming Interface) which provides, in accordance with a request outside the management application, management information managed by the management application. For example, in the case of a REST (Representational State Transfer) API, an access destination to access the management information providing unit 403 is "http://<management application end point>/setting". The management information is information used and recorded when the management application operates, and includes, for example, the setting information and operation log information of the management application, and information indicating the collection state of the device information managed by the device information collection unit 401 described above.

The management information providing unit 403 is used to provide management information managed by itself in response to a request from another management application if the management application cannot communicate with the device management server 101 for some reason. That is, normally operating another application can obtain the management information from the management information providing unit 403 by accessing the access destination indicated above. Then, the normally operating other management application collects information on a management application in which an abnormality occurs and sends it to the device management server 101 by proxy. This makes it possible to grasp, on the side of the device management server 101, a specific factor that sets the management application in an abnormal state. The type of management information provided by the management information providing unit 403 is not particularly limited as long as information can be collected via the management application. When providing a plurality of pieces of management information, APIs may be different from each other on a management information basis, or one API may collect the plurality of pieces of management information altogether.

When the management application provides the management information by the management information providing unit 403, an access token management unit 404 issues an access token (token information) used to authenticate a request source and manages the issued access token. A method related to the issue of the access token is not particularly limited. An expiration date may be set and additionally managed in the access token issued here. An access token sending unit 405 sends the issued access token to the device management server 101 and causes the device management server 101 to manage it in association with the sent management application.

When the management information providing unit 403 receives an obtaining request, an access token authentication unit 406 determines whether an access token that matches the access token managed by the access token management unit 404 is given to the obtaining request. If the access tokens match, the access token authentication unit 406 determines authentication success and continues processing by the management information providing unit 403. If an expiration date is set in the access token, the access token authentication unit 406 also determines whether the access token falls within this expiration date. On the other hand, if the access tokens do not match, the access token authentication unit 406 determines an authentication failure and does not execute the processing by the management information providing unit 403. As described above, the management application provides, via the management information providing unit 403, the management information for only a proper request source with the access token.

The access token management unit 404 may issue access tokens periodically. This makes it possible to exclude a request source with an old access token and increase a security strength. An arrangement may be adopted in which the access token management unit 404 and the access token authentication unit 406 exist separately as authentication applications different from the management application. In this case, the access token sending unit 405 obtains access tokens issued by the authentication applications and sends them to the device management server 101. When the management information providing unit 403 receives an obtaining request, the authentication applications are requested for authentication processing to determine, in accordance with an authenticated result, whether to execute the processing by the management information providing unit 403.

An investigation request acceptance unit 407 accepts, from the device management server 101, an investigation request to the management application in the abnormal state. The investigation request indicates making a request, in order to specify an abnormality occurring in correspondence with a certain management application in an abnormal state, that the normally operating management application should collect various kinds of information from the management application. A management application to be investigated (a management application in an abnormal state) will be referred to as an "investigated management application" here for the sake of descriptive simplicity. A management application which conducts an investigation (a management application which receives an investigation request) will be referred to as an "investigation management application".

When accepting the investigation request, the investigation management application receives, from the device management server 101, the access token and information of the management information providing unit 403 with respect to the investigated management application. As one investigation request accepting method, there is a method in which the management application periodically confirms with the device management server 101 whether there are processing requests to itself and accepts an investigation request as one of the processing requests. As another method for the accepting methods, there is a method in which the device management server 101 sends an investigation request to the management application. However, an investigation request method is not limited to these but may be another method. Note that a method of deciding to which management application out of a plurality of management applications an investigation request is made by the device management server 101 will be described later together with a processing sequence.

A management information collection unit 408 invokes, by using a received access token, the management information providing unit 403 of the investigated management application designated by the investigation request from the device management server 101 and collects management information from the investigated management application. An operation apparatus information collection unit 409 collects operation apparatus information on the information processing apparatus 103 or each image forming apparatus 102 which is installed with the management application without going through the management information providing unit 403 of the investigated management application. Information regarding an activation state and operating system, information regarding a network, and the like in each apparatus onto which is installed with the management application correspond to the operation apparatus information. However, the operation apparatus information is not particularly limited as long as it is related to communication with the device management server 101. The operation apparatus information collection unit 409 may change an obtaining method and obtaining contents in accordance with the image forming apparatuses 102 and the information processing apparatus 103. For example, even if it is impossible to communicate various kinds of information to the device management server 101 due to a factor, such as the activation state, on the side of the apparatus in which the management application operates, the operation apparatus information collection unit 409 can collect information regarding the factor by obtaining the operation apparatus information.

When operating as the investigation management application, a management information sending unit 410 sends, to the device management server 101, the management information collected by the management information collection unit 408 and the operation apparatus information collected by the operation apparatus information collection unit 409 as a response to the investigation request. A recovery process execution unit 411 causes the investigated management application to execute a recovery process if the investigation request acceptance unit 407 accepts, from the device management server 101, a recovery process execution request of the investigated management application. The recovery process includes, for example, reactivation of the management application, reactivation of each apparatus in which the management application operates, or the like. This makes it possible, from the device management server 101, not only to collect information from a management application in which an abnormal state occurs but also to attempt restoration of the management application.

(Device Management Server)

Figure 5:
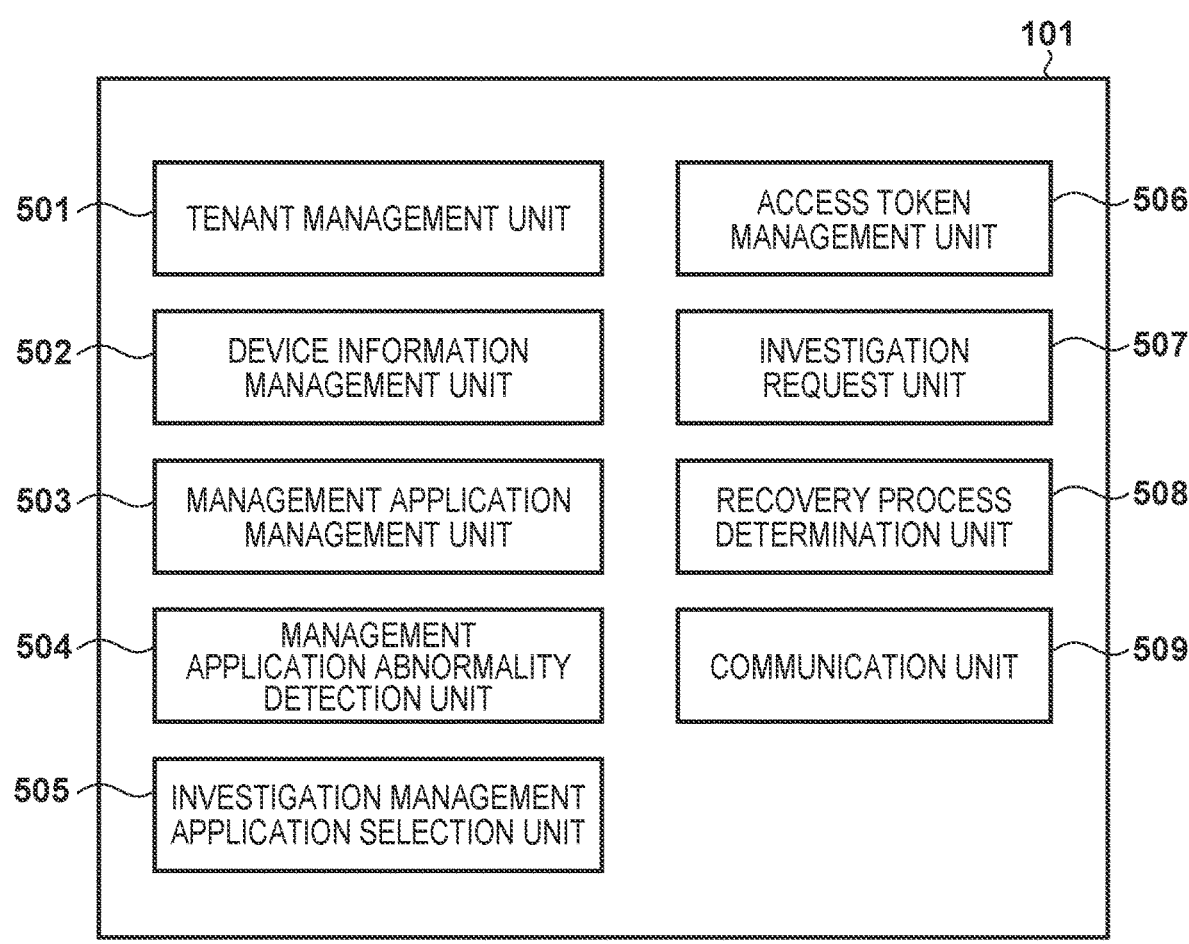
FIG. 5 is a block diagram showing an example of the software arrangement of a device management server according to the first embodiment.

FIG. 5 shows an example of the software arrangement of the device management server 101. Programs which implement the functions of the respective software arrangement shown in FIG. 5 are stored in the hard disk 303. These functions are implemented by causing the CPU 301 to load the programs into the memory 302 and execute them.

A tenant management unit 501 manages a device, collected device information, or the like by separating it as tenants for each customer A or customer B in FIG. 1. The tenant here is represented for each management group provided in accordance with a contract or a customer. A management target, for example, the image forming apparatus according to this embodiment or the like is set for each tenant. As managing methods on a tenant basis, there are a method of separating database, a method of separating a table, a method of making a distinction with an ID in the table, a method of changing an access right on the tenant basis, and the like. However, the present invention is not limited to these specific methods. It becomes possible, by management for each tenant, to prevent interference between the tenants and to implement a secure environment. Furthermore, the device management server 101 may include a part which provides a screen (not shown) for accepting, from the client terminal 104 or the like, the management settings or various requests of various devices.

A device information management unit 502 manages, on the tenant basis, the device information of each image forming apparatus 102 collected from the management application. A management application management unit 503 manages, on the tenant basis, information on a management application arranged in a customer environment.

A management application abnormality detection unit 504 detects a management application in an abnormal state in the management application management unit 503. As an example of an abnormality detection method, an abnormality is determined if there has been no communication for a certain period or more since the management application last communicated with the device management server 101. Alternatively, an abnormality may be determined in response to, for example, reception, from the management application, of a notification that the free space of the hard disk of an operation apparatus is small. A specific period for detecting the abnormality, the type of notifications, and the like here are defined in advance and managed.

An investigation management application selection unit 505 selects another management application which conducts an investigation (investigation management application) for a management application determined as abnormal by the management application abnormality detection unit 504. Selection processing will be described in detail later with reference to FIGS. 9A and 9B.

An access token management unit 506 manages, on the tenant basis, the access token received from the access token sending unit 405 of the management application. An investigation request unit 507 makes an investigation request to the investigation request acceptance unit 407 of the management application selected by the investigation management application selection unit 505. The management application that accepts this investigation request plays a role as the investigation management application. When making the investigation request, the investigation request unit 507 obtains, from the access token management unit 506, the access token that has been received in advance from the management application with the detected abnormality and sends it together with the investigation request.

A recovery process determination unit 508 determines whether to execute the recovery process on the management application in the abnormal state. Determination processing of the recovery process will be described in detail later with reference to FIG. 10. A communication unit 509 is in charge of communication processing with the management application, and performs, for example, reception of the device information, sending of the investigation request, and reception of the management information.

In this embodiment, the device management server 101 determines an abnormality in the management application, making it possible to request another management application for an investigation even if the management application cannot communicate with the device management server 101 suddenly. It is further possible, by giving an access token only to an appropriate management application selected by the investigation management application selection unit 505, to cause only the appropriate management application to collect management information of an abnormal management application.

[Data Structure Example]

FIG. 6 is a table showing an example of the data structure of management application information and an access token managed by the management application management unit 503 and access token management unit 506 of the device management server 101.

A tenant ID 601 is identification information (identifiers) for uniquely identifying a tenant in the tenant management unit 501. The tenant ID having the same record is identified as information in the same tenant. Note that the respective apparatuses can be arranged at physically different sites even if they have the same tenant ID. A management application ID 602 is identification information for uniquely identifying a management application arranged in the customer environment. For example, the device management server 101 issues the management application ID when the management application is installed onto the customer environment and communicates with the device management server 101 for the first time. A type 603 is information for identifying whether the apparatus which is installed with the management application is the image forming apparatus 102 or the information processing apparatus 103. In FIG. 6, the apparatus which is installed with the management application is indicated as "Device" if it is the image forming apparatus 102, and indicated as "PC" if it is the information processing apparatus 103.

A Version 604 is information indicating the software versions of management applications. The type (item) of management information collectable by the management information providing unit 403 or the management information collection unit 408 changes in accordance with the version of the management application. This is because the function of the management application is changed/extended in accordance with its version. In this embodiment, version information of the management application is used when the type of management information collectable by the management information providing unit 403 or the management information collection unit 408 is specified. For example, a management application of version "1.0.0" includes neither the management information providing unit 403 nor the management information collection unit 408. A management application of version "1.2.0" has the smaller number of types of management information collectable by the management information providing unit 403 or the management information collection unit 408 than a management application of version "2.0.0". Version information of such management applications and the functions (parts) provided in accordance with their versions may be managed in association with each other in a table other than the table shown in FIG. 6.

An access token 605 is information indicating access tokens received from the access token sending unit 405 of the management applications. In this embodiment, the management application of version "1.0.0" does not include the management information providing unit 403, and thus the access token is not managed either. On the other hand, each management application from version "1.2.0" includes the management information providing unit 403 and corresponds to the access token.

A status 606 is information indicating the states of the management applications and is updated by the management application abnormality detection unit 504. "Normal" or "abnormal" is set as the value of the status 606. Note that for "abnormal", its contents may be shown in more detail. A last communication date and time 607 is information indicating a date and time when each management application last communicates with the device management server 101. In this embodiment, the management application abnormality detection unit 504 sets the status 606 as "abnormal" when a time elapsed since the last communication date and time of the management application in the second line exceeds a preset threshold. It may be possible for the threshold here to be set for each tenant or to be set to have the same value uniformly. An installation location 608 is information indicating the locations of the management applications arranged in the customer environment and manages an arbitrary character string input by a setting screen (not shown) of each management application in the device management server 101.

Note that the data structure shown in FIG. 6 is an example, and a table structure and the type of information to be managed are not limited to this example. Moreover, various kinds of information may be managed by dividing them into a plurality of tables or may be managed with other information.

[Processing Sequence]

(Management Information Collection Processing)

Figure 7:
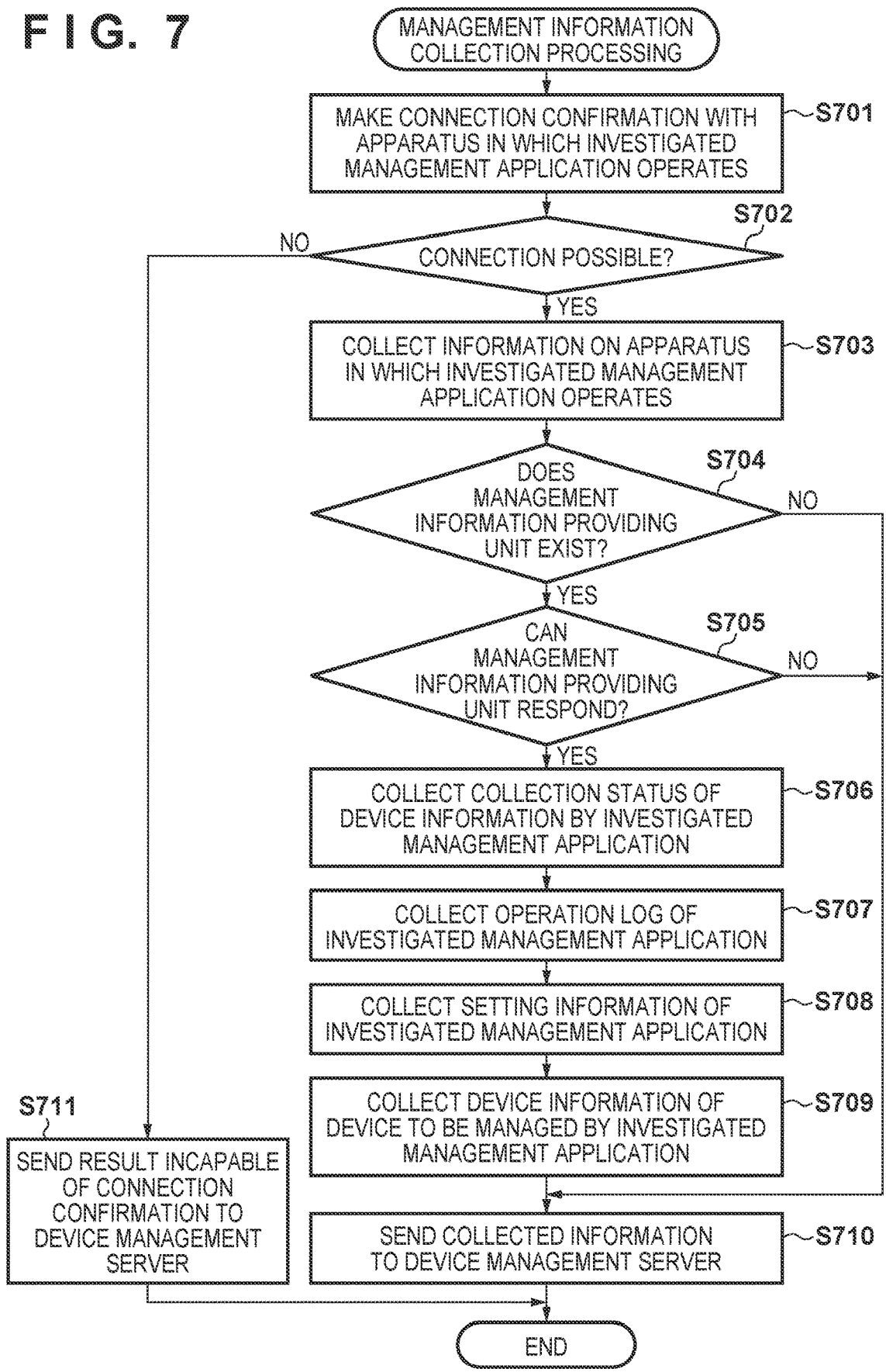
FIG. 7 is a flowchart showing management information collection processing by the management application.

FIG. 7 is a process flowchart when a management application (investigation management application) that receives an investigation request from the device management server 101 collects management information from a management application (investigated management application) to be investigated. The respective constituent elements of the software arrangement in the management application shown in FIG. 4 are implemented by operating the CPU, memory, hard disk, and the like of each image forming apparatus 102 or information processing apparatus 103 installed in this embodiment. Then, the procedure of a flowchart to be described below is stored, as a program, in the storage unit of one of the memory and hard disk of each constituent element, and is performed by the CPU.

In step S701, the operation apparatus information collection unit 409 of the investigation management application makes a connection confirmation with an apparatus in which the investigated management application operates. As an example of connection confirmation processing, a communication confirmation is tried by executing a PING command on the IP address of the investigated management application indicated in the investigation request. As a result of this processing, it is determined whether the connection confirmation succeeds depending on whether there is a response from the investigated management application.

In step S702, the operation apparatus information collection unit 409 of the investigation management application determines whether the result of the connection confirmation is a success. If the result of the connection confirmation is a failure (NO in step S702), the process advances to step S711. If the result of the connection confirmation is the success (YES in step S702), the process advances to step S703.

In step S703, the operation apparatus information collection unit 409 of the investigation management application collects information (operation apparatus information) on the apparatus in which the investigated management application operates.

In step S704, the management information collection unit 408 of the investigation management application confirms whether the management information providing unit 403 exists in the investigated management application. If the management information providing unit 403 exists (YES in step S704), the process advances to step S705. If the management information providing unit 403 does not exist (NO in step S704), the process advances to step S710. In this embodiment, the management information collection unit 408 can determine the presence of the management information providing unit 403 by the version information of the management application, as described above with reference to FIG. 6. For example, when the investigated management application is the management application on the fourth line in FIG. 6, the management information collection unit 408 of the investigation management application determines that the management information providing unit 403 does not exist in the investigated management application. Note that a determination method is not limited to this, but another method may be used. As an example of another determination method, the device management server 101 may perform the above-described determination and send, to the investigation management application, an investigation request according to a determination result.

In step S705, the management information collection unit 408 of the investigation management application determines whether the management information providing unit 403 of the investigated management application can respond. If the management information providing unit 403 can respond (YES in step S705), the process advances to step S706. If the management information providing unit 403 cannot respond (NO in step S705), the process advances to step S710. As an example of a determination method, a determination can be made based on a result obtained by invoking a dedicated API which confirms whether the management information providing unit 403 can respond.

In step S706, the management information collection unit 408 of the investigation management application collects information regarding the collection status of the device information by requesting that the management information providing unit 403 of the investigated management application should provide this information. Following this request, the management information collection unit 408 of the investigated management application collects information indicating the collection state of device information managed by the device information collection unit 401 of the investigated management application and provides this for the investigation management application. By collecting the information, the investigation management application (or the device management server 101) can determine an urgency of abnormality from the collection status by the investigated management application. For example, a past collected print performance log is automatically deleted after a lapse of a predetermined time or when it is stored by a predetermined capacity. Therefore, in the investigated management application, if the pointer of collected print performance log information is old, uncollected print performance log information may be deleted from the image forming apparatus 102 to be managed, making it possible to determine that urgency is high.

In step S707, the management information collection unit 408 of the investigation management application collects operation log information of the investigated management application by requesting that the management information providing unit 403 of the investigated management application should provide the operation log information. The investigation management application collects the operation log information and sends it to the device management server 101, allowing a developer to collect, from the device management server 101, the operation log information of a management application in an abnormal state. This allows, for example, the developer to investigate the cause of a failure without going to the customer environment.

In step S708, the management information collection unit 408 of the investigation management application collects the setting information of the investigated management application by requesting that the management information providing unit 403 of the investigated management application should provide the setting information. A network setting such as an IP address or a proxy server, a sending setting such as a sending timing or an authentication method for the device management server 101, and the like correspond to the setting information. It is possible, by collecting the setting information, to investigate/specify the cause of incommunicability with the device management server 101 due to a setting change or defective setting in the investigated management application.

In step S709, the management information collection unit 408 of the investigation management application requests that the management information providing unit 403 of the investigated management application should provide managed device information. This allows the investigation management application to collect the device information of the image forming apparatus 102 to be managed by the investigated management application and to send it to the device management server 101 on behalf of the investigated management application. As an example of a collection unit of the device information, the device information of the image forming apparatus 102 managed by the investigated management application is collected via the API of the investigated management application. This allows the investigation management application to send, by proxy, the collected device information to the device management server 101 when the device information sending unit 402 of the investigated management application does not operate normally for some reason while the device information collection unit 401 of the investigated management application operates normally.

In step S710, the management information sending unit 410 of the investigation management application sends, to the device management server 101, the various kinds of information collected in steps S703 to S709. At this time, information that cannot be collected is also sent together with error contents returned by the management information providing unit 403 of the investigated management application because a result that the information cannot be collected is useful for a cause investigation. Then, this processing sequence ends.

In step S711, the management information collection unit 408 of the investigation management application sends, to the device management server 101, a result that the connection confirmation cannot be made in processing of step S701. Then, this processing sequence ends.

Note that a management information collection order described in steps S706 to S709 is not limited to an order shown in FIG. 7 but may be, for example, another order in consideration of the priority, processing load, or the like of the information. In accordance with the version of the investigated management application, as for management information that cannot be collected from the investigated management application apparently, collection processing of the management information may be skipped.

(Management Information Providing Processing)

Figure 8:
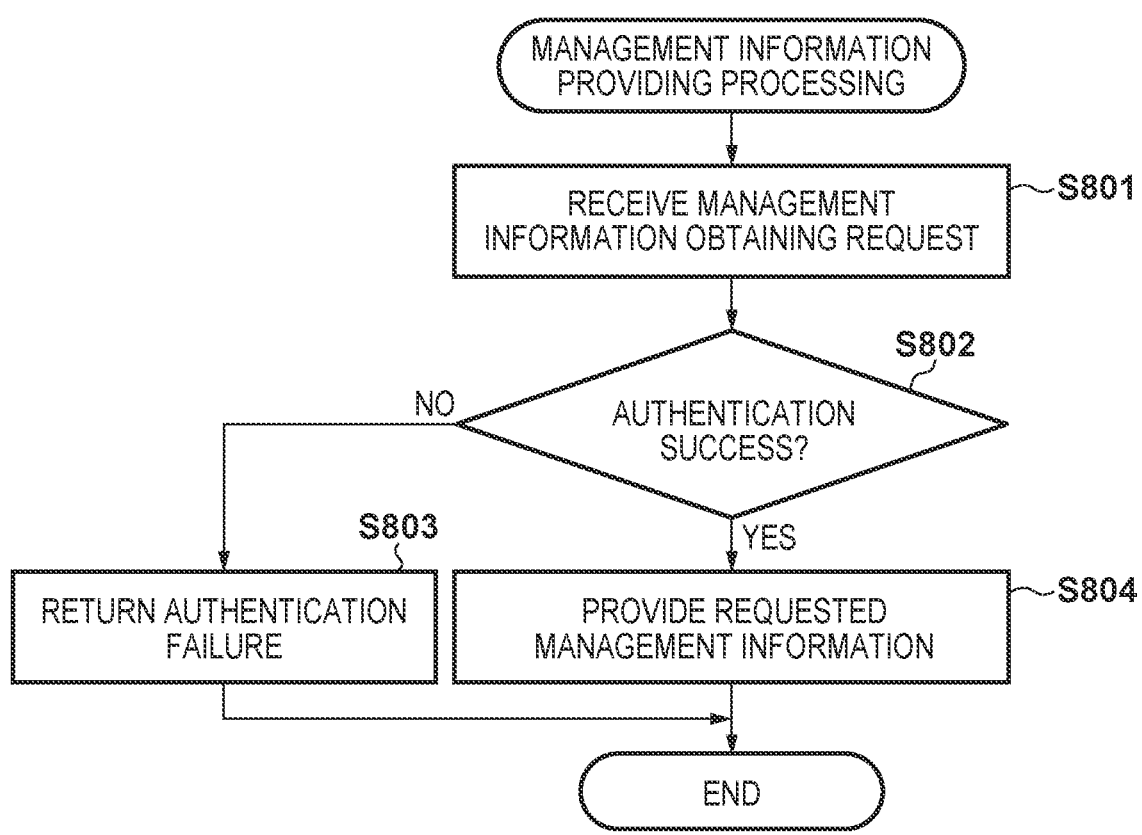
FIG. 8 is a flowchart showing management information providing processing by the management application.

FIG. 8 is a process flowchart when a management application (investigated management application) to be investigated provides management information for a management application (investigation management application) that receives an investigation request. The respective constituent elements of the software arrangement in the management application shown in FIG. 4 are implemented by operating the CPU, memory, hard disk, and the like of each image forming apparatus 102 or information processing apparatus 103 installed in this embodiment. Then, the procedure of a flowchart to be described below is stored, as a program, in the storage unit of one of the memory and hard disk of each constituent element, and is performed by the CPU. As a matter of course, various requests cannot be received from the investigation management application if the connection confirmation fails in step S701 of FIG. 7, and thus this processing sequence is not performed. A case arises in which this processing sequence is not performed either if a failure occurs in an apparatus itself which is installed with the investigated management application.

In step S801, the management information providing unit 403 of the investigated management application receives, from the investigation management application, a management information obtaining request.

In step S802, the access token authentication unit 406 of the investigated management application verifies an access token received together with the obtaining request and determines whether the request is from a proper request source. If the access token authentication unit 406 determines that authentication by the access token fails (NO in step S802), the process advances to step S803. If the authentication succeeds (YES in step S802), the process advances to step S804.

In step S803, the management information providing unit 403 of the investigated management application sends, to the request source of the obtaining request, a result that the authentication fails. Then, this processing sequence ends.

In step S804, the management information providing unit 403 of the investigated management application provides the request source with management information requested in the obtaining request. Then, this processing sequence ends.

Note that as described above, if a part which authenticates the access token is provided, as an authentication application, separately from the management application, in step S802, the management application makes an authentication request for that authentication application.

(Investigation Management Application Selection Processing)

Figure 9A:
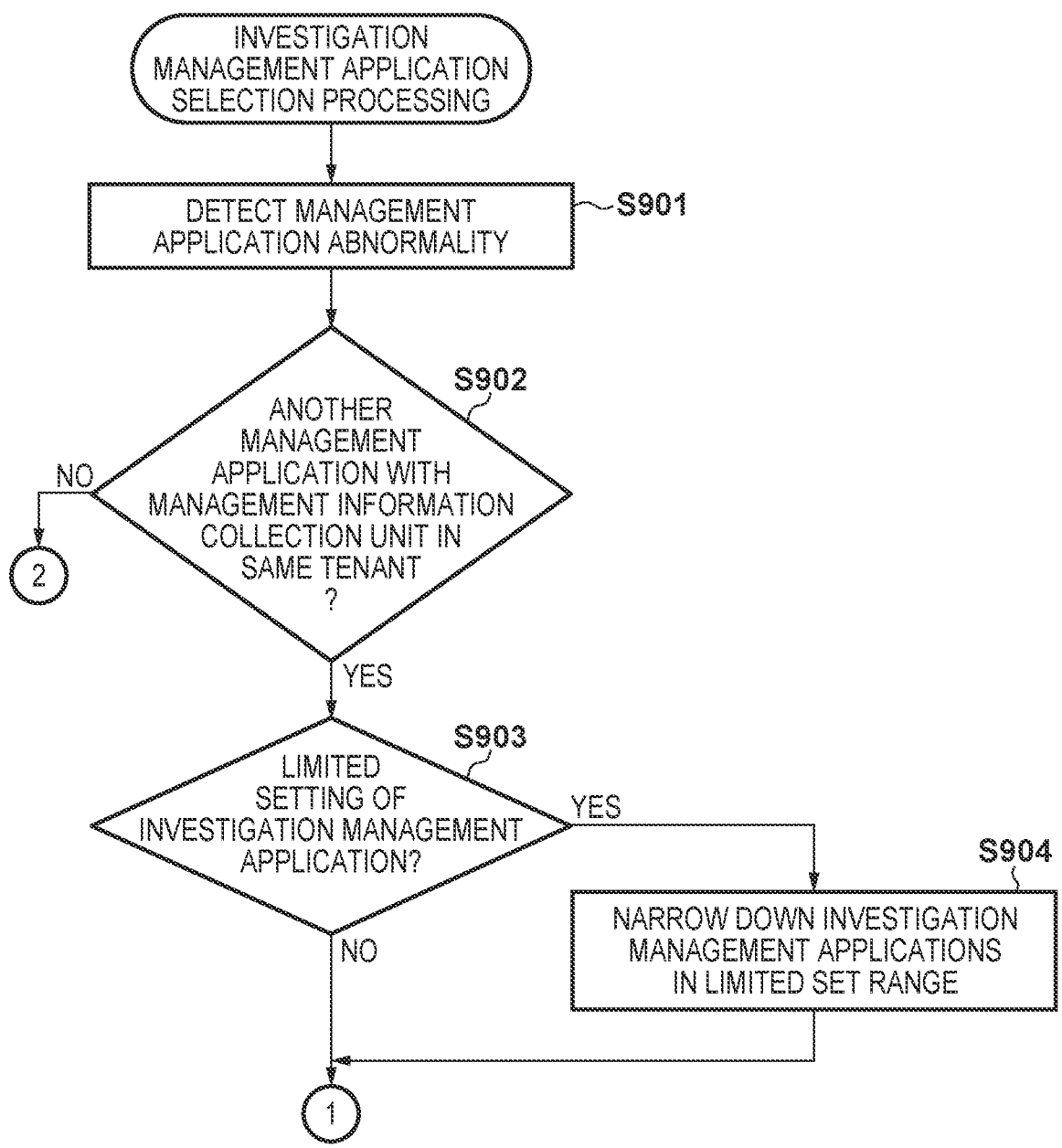
FIGS. 9A and 9B are flowcharts showing selection processing by the device management server.
Figure 9B:
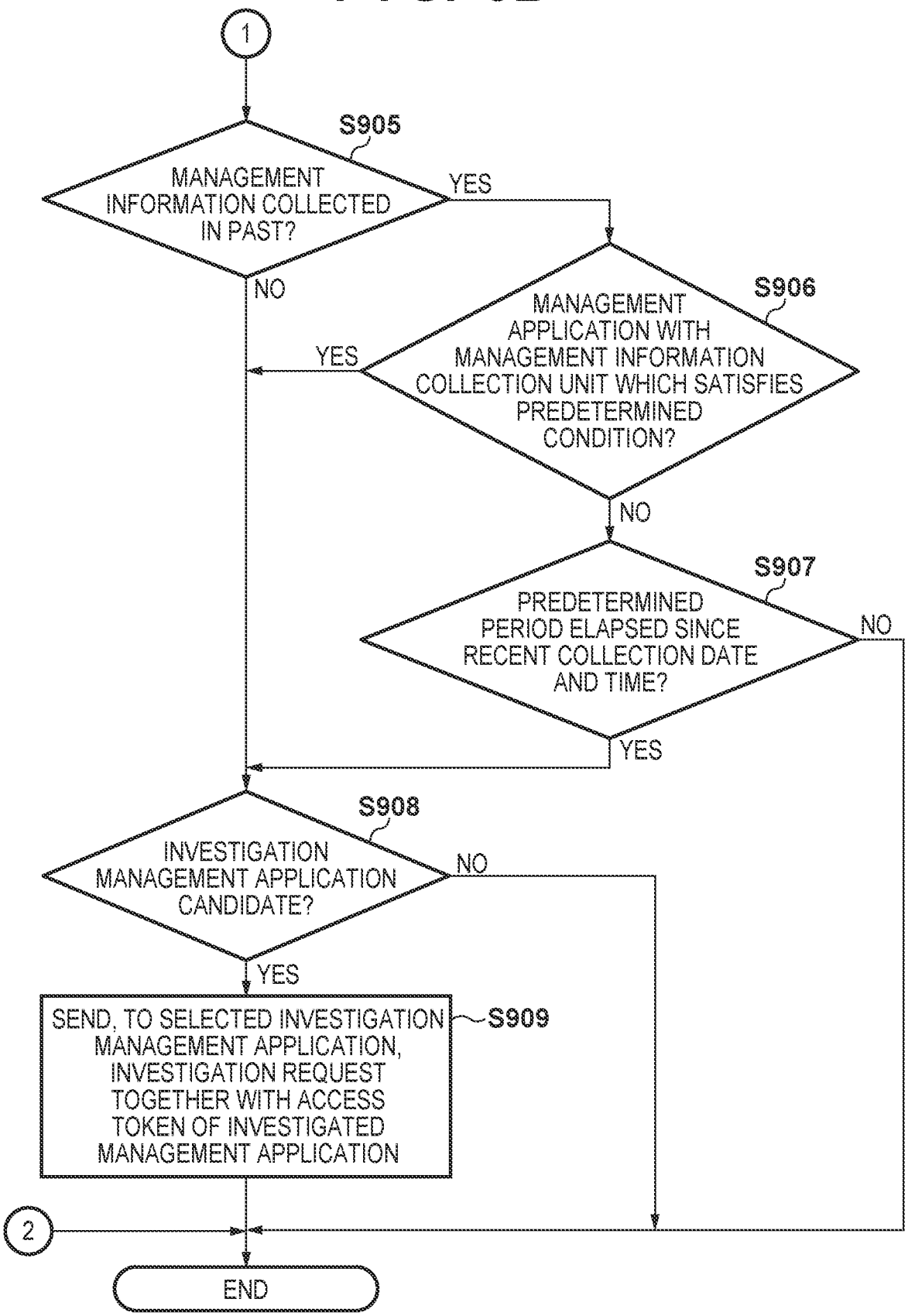

FIGS. 9A and 9B are process flowcharts when the device management server 101 selects a management application (investigation management application) which conducts an investigation. This processing may be performed periodically at a predetermined time interval or may be performed at a timing when a predetermined event occurs. The respective constituent elements of the software arrangement of the device management server 101 shown in FIG. 5 are implemented by operating the CPU, memory, hard disk, and the like of the information processing apparatus 103 in this embodiment. Then, the procedure of a flowchart to be described below is stored, as a program, in the storage unit of one of the memory and hard disk of each constituent element, and is performed by the CPU.

In step S901, the management application abnormality detection unit 504 detects a management application in an abnormal state with reference to the table (status 606) shown in FIG. 6.

In step S902, the investigation management application selection unit 505 determines whether another management application in a normal state which includes the management information collection unit 408 exists in the same tenant as the management application in the abnormal state detected in step S901. The presence is specified here, for example, via the management application management unit 503 with reference to the tenant ID 601, version 604, status 606, and the like shown in FIG. 6. If the other management application in the normal state which includes the management information collection unit 408 does not exist in the same tenant (NO in step S902), the investigation management application selection unit 505 determines that a management application that allows an investigation request does not exist, and this processing sequence ends. On the other hand, if the other management application exists (YES in step S902), the process advances to step S903.

In step S903, the investigation management application selection unit 505 determines whether there is a limited setting for the investigation management application. The limited setting here indicates a setting in which a management application which conducts an investigation from the user (a management application capable of operating as the investigation management application) is limited in advance by a setting screen (not shown). A setting is taken as an example which limits operating as the investigation management application only to a management application with the same installation location or the same subnet setting as the investigated management application. This makes it possible to control an investigation request target when, for example, communication is not preferably performed between management applications at positions physically spaced apart from each other even in the same tenant. If the investigation management application selection unit 505 determines that there is the limited setting (YES in step S903), the process advances to step S904. If the investigation management application selection unit 505 determines that there is no limited setting, (NO in step S903), the process advances to step S905.

In step S904, the investigation management application selection unit 505 narrows down candidates for a management application that conducts an investigation in a set limited-setting range.

In step S905, the investigation management application selection unit 505 determines whether the management information was collected in the past for the management application in the abnormal state. If the management information was collected in the past (YES in step S905), the process advances to step S906. If the information was not collected (NO in step S905), the process advances to step S908.

In step S906, the investigation management application selection unit 505 confirms the presence/absence of a management application with the management information collection unit 408 which satisfies a predetermined condition. If the management information which satisfies the predetermined condition exists (YES in step S906), the process advances to step S908. If the management application does not exist (NO in step S906), the process advances to step S907. The investigation management application selection unit 505 determines, from function information of the management information collection unit 408 or attribute information (version information or the like) of a management application corresponding to the management information collection unit 408, the presence/absence of the management information collection unit 408 which satisfies the predetermined condition. Whether the management information collection unit 408 can collect more management information than management information collected recently corresponds to the predetermined condition. For example, if the version of a management application that has collected the management information recently is "1.2.0", the investigation management application selection unit 505 determines whether the management application of version "2.0.0" exists in the same tenant. Consequently, the investigation management application selection unit 505 requests a reinvestigation without leaving an interval when more management information can be collected than in a past investigation result even if the management information collected in the past exists.

In step S907, the investigation management application selection unit 505 determines whether a predetermined period has elapsed since a recent collection date and time. If the predetermined period has elapsed (YES in step S907), the process advances to step S908. If the predetermined period has not elapsed (NO in step S907), the investigation management application selection unit 505 determines that the management application that allows the investigation request does not exist, terminating this processing sequence. This makes it possible, by leaving a predetermined interval, not to apply a load to the management application in the abnormal state if there is no possibility that more management information can be collected than the management information collected in the past. The predetermined period here is set and held in advance.

In step S908, the investigation management application selection unit 505 determines whether there is the candidate for the management application that conducts the investigation. If there is the candidate (YES in step S908), the process advances to step S909. If there is no candidate (NO in step S908), this processing sequence ends.

In step S909, the investigation request unit 507 sends the investigation request to the selected management application. At this time, the investigation request unit 507 gives and sends an access token registered in advance by the management application to be investigated with reference to the table (access token 605) shown in FIG. 6. Then, this processing sequence ends.

Note that for a method of confirming processing requests periodically from a management application side to the device management server 101, the investigation request unit 507 sends the investigation requests if the management application that can be confirmed in step S909 is a candidate for the selected investigation management application. On the other hand, for a method of sending the investigation request to the management application by the device management server 101, the investigation request unit 507 sends the investigation request to one or more arbitrary management applications out of candidates for the selected management applications. Furthermore, the investigation request unit 507 may confirm with the management application management unit 503 the last communication date and time 607 of the management application, and preferentially make a request to a management application, out of the selected candidates, with a last communication date and time which is relatively new and a high possibility of being able to communicate with the device management server 101.

(Necessity Determination Processing of Recovery Process)

Figure 10:
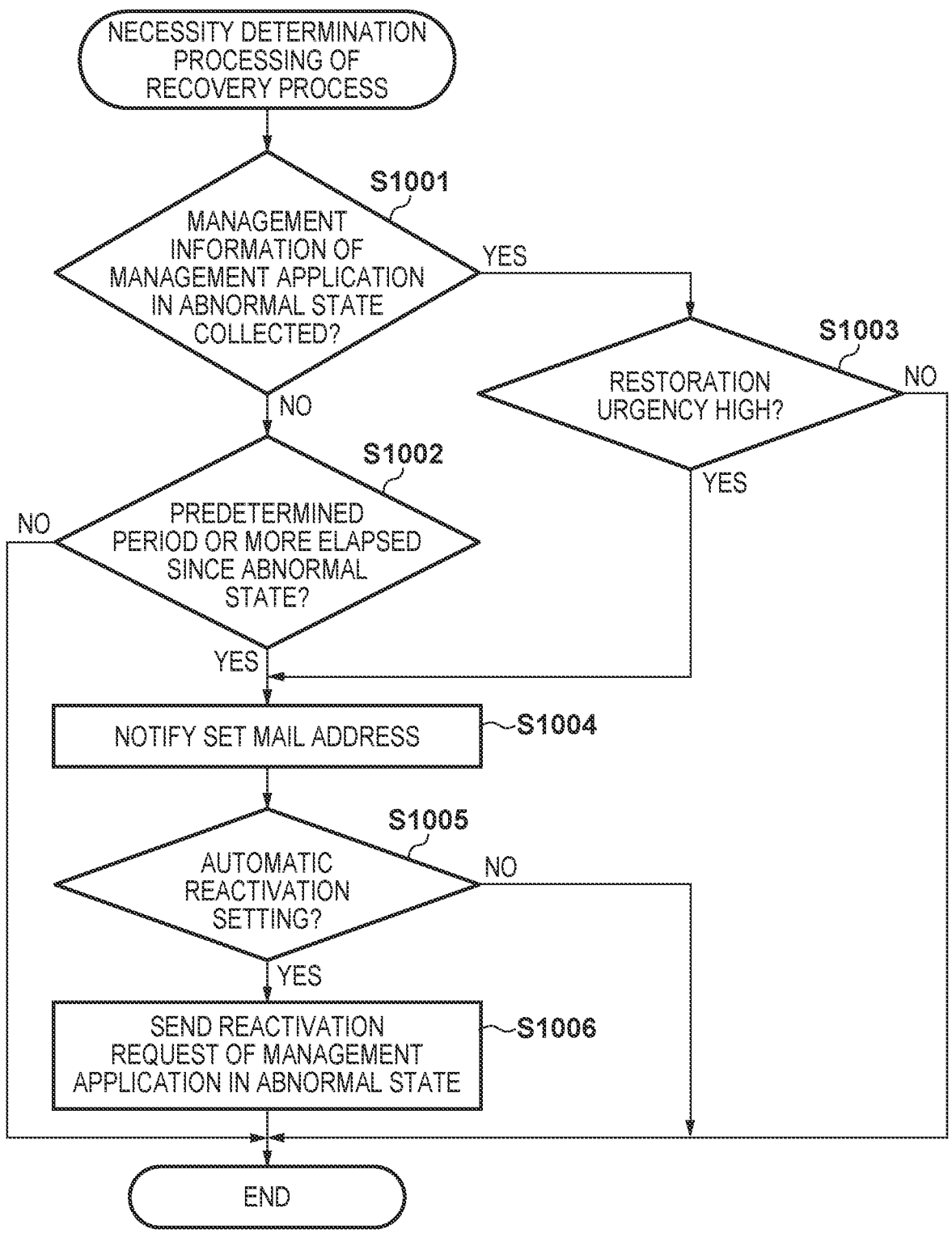
FIG. 10 is a flowchart showing necessity determination processing of a recovery process by the device management server.

FIG. 10 is a process flowchart when it is determined whether to perform a recovery process on a management application detected being in an abnormal state by the device management server 101. The respective constituent elements of the software arrangement of the device management server 101 shown in FIG. 5 are implemented by operating the CPU, memory, hard disk, and the like of the information processing apparatus 103 in this embodiment. Then, the procedure of a flowchart to be described below is stored, as a program, in the storage unit of one of the memory and hard disk of each constituent element, and is performed by the CPU.

In step S1001, the recovery process determination unit 508 determines whether management information was collected in the past for the management application in the abnormal state. If the information was not collected (NO in step S1001), the process advances to step S1002. If the information was collected (YES in step S1001), the process advances to step S1003.

In step S1002, the recovery process determination unit 508 determines whether a predetermined period or more has elapsed since detection of the abnormal state. Note that a time elapsed since detection of an abnormality can be specified based on, for example, a time elapsed since the last communication date and time 607 shown in FIG. 6. The predetermined period here is set and held in advance. If the predetermined period or more has elapsed (YES in step S1002), the process advances to step S1004. If the predetermined period or more has not elapsed (NO in step S1002), this processing sequence ends, assuming that urgency is not high.

In step S1003, the recovery process determination unit 508 determines, from the collected management information, the restoration urgency of the management application in the abnormal state. If the urgency is high (YES in step S1003), the process advances to step S1004. If the urgency is not high (NO in step S1003), this processing sequence ends. As a determination method here, if the pointer of the collected print performance log information is old by a predetermined period or more as in the aforementioned example, the collection omission of the print performance log information may occur, determining that the urgency is high. Note that the determination method here is not limited to the above, but it may be determined that the urgency is high when, for example, a predetermined event occurs.

In step S1004, the recovery process determination unit 508 notifies a preset mail address that the management application in the abnormal state cannot communicate with the device management server 101 or the restoration urgency is high. The mail address set here may be that of a customer provided with a device management service for the management application in the abnormal state, or that of a system administrator or developer of the device management service.

In step S1005, the recovery process determination unit 508 confirms an automatic reactivation setting in detecting the abnormal state. If the automatic reactivation setting is enabled (YES in step S1005), the process advances to step S1006. If the setting is not enabled (NO in step S1005), this processing ends. Automatic reactivation is setting, by the user in advance from a setting screen (not shown), whether to perform reactivation if it is determined that the management application enters the abnormal state, and the urgency is high. This setting is set for each management application (or on the tenant basis) and managed in the device management server 101.

In step S1006, the recovery process determination unit 508 requests that the investigation management application selected in FIGS. 9A and 9B should reactivate the management application in the abnormal state. Then, this processing sequence ends.

It is possible, by a recovery process determination by this recovery process determination unit 508, to perform restoration processing such as a mail notification and automatic reactivation on a management application of high urgency.

As described above, it is possible, with this embodiment, to securely collect abnormal information of a device management application in a server even if the device management application suddenly enters an abnormal state.

<Second Embodiment>

In the first embodiment, the management information providing unit 403 of the management application determines the request source as the proper request source by authenticating, by the access token authentication unit 406, that it has an appropriate access token. In the second embodiment, it is authenticated between management applications in advance that they are proper management applications in the same tenant in order to further improve a security strength. That is, this embodiment has an arrangement in which mutual authentication is performed in advance between the management applications in the same tenant to issue an authenticated key (authentication information).

Figure 11:
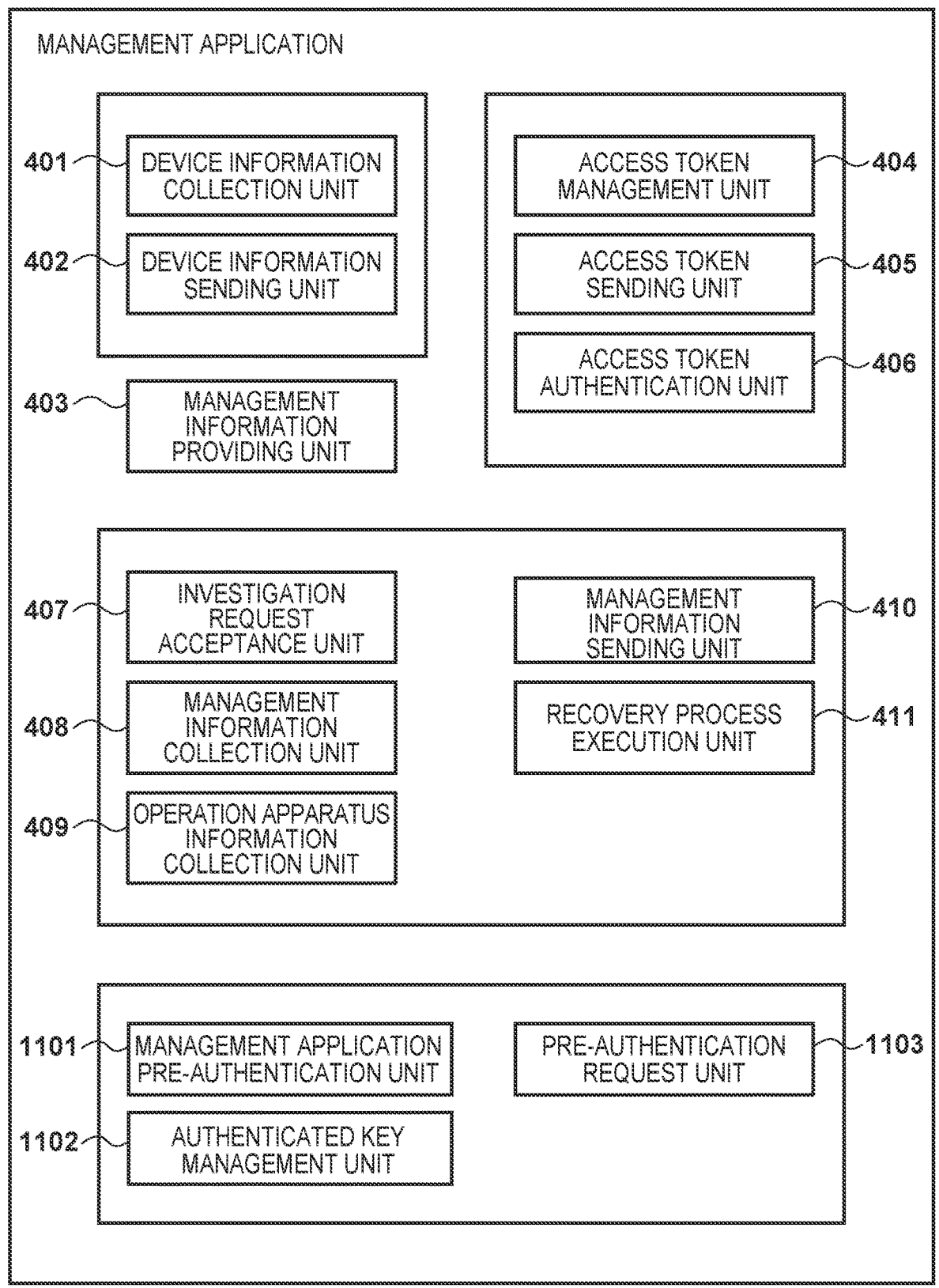
FIG. 11 is a block diagram showing an example of the software arrangement of a management application according to the second embodiment.

FIG. 11 shows an example of the software arrangement of a management application installed onto each image forming apparatus 102 or an information processing apparatus 103 according to the second embodiment. FIG. 11 is different from FIG. 4 in that a management application pre-authentication unit 1101, an authenticated key management unit 1102, and a pre-authentication request unit 1103 are added. The same reference numerals denote the same arrangement as in FIG. 4 described in the first embodiment, and a description thereof will be omitted.

The management application pre-authentication unit 1101 authenticates whether another management application is a proper management application in the same tenant. As an example of an authentication method, there is a method of confirming unique information for each tenant held in the management application or a method of making a confirmation by making an inquiry at a device management server 101. Performing wireless communication such as Bluetooth® or Wi-Fi (Wireless Fidelity®) depending on a distance and being a management application present in a predetermined range may be added to a determination of the same tenant.

When pre-authentication by the management application pre-authentication unit 1101 succeeds, the authenticated key management unit 1102 issues an authenticated key and sends the authenticated key to a management application which has been authenticated that the pre-authentication succeeds. It is verified whether an authenticated key of a management application of the request source is proper when a management information providing unit 403 is invoked. As described above, processing including communication may be impossible if the management application is in the abnormal state. Therefore, pre-authentication using communication is performed while the management application is in a normal state, and simple authentication such as authentication using an authenticated key is performed when the management application enters the abnormal state. A method of authenticating the authenticated key or the lie used here is not particularly limited.

The pre-authentication request unit 1103 requests pre-authentication of another management application. In this embodiment, the pre-authentication request unit 1103 receives, from the device management server 101, the list of management applications to request. Then, the pre-authentication request unit 1103 mutually performs pre-authentication by the aforementioned authentication unit with the management application pre-authentication unit 1101 and authenticated key management unit 1102 of the other management application included in that list.

In this embodiment, in the authentication processing in step S802 of FIG. 8 described in the first embodiment, authentication by the authenticated key management unit 1102 is performed, in addition to authentication by an access token authentication unit 406. In this embodiment, it is possible to further improve the security strength, as compared with the first embodiment. For example, it is possible to prohibit invocation of the management information providing unit 403 from a program which acquires an access token illicitly.

<Third Embodiment>

In the first embodiment, the investigation management application selection unit 505 of the device management server 101 selects the investigation management application in the same tenant or in the limited-setting range of the investigation management application. In this case, there is a possibility that management applications originally incapable of network connection with a management application (investigated management application) to be investigated are selected even if the management applications belong to the same tenant. If there is such a possibility, it is impossible to specify whether a problem is caused by the selected investigation management application or the investigated management application when the result that the connection confirmation cannot be made with the investigated management application is obtained in step S711 of FIG. 7 is obtained. Therefore, an arrangement to solve this problem will be described in this embodiment.

[Software Arrangement]
(Management Application)

Figure 12:
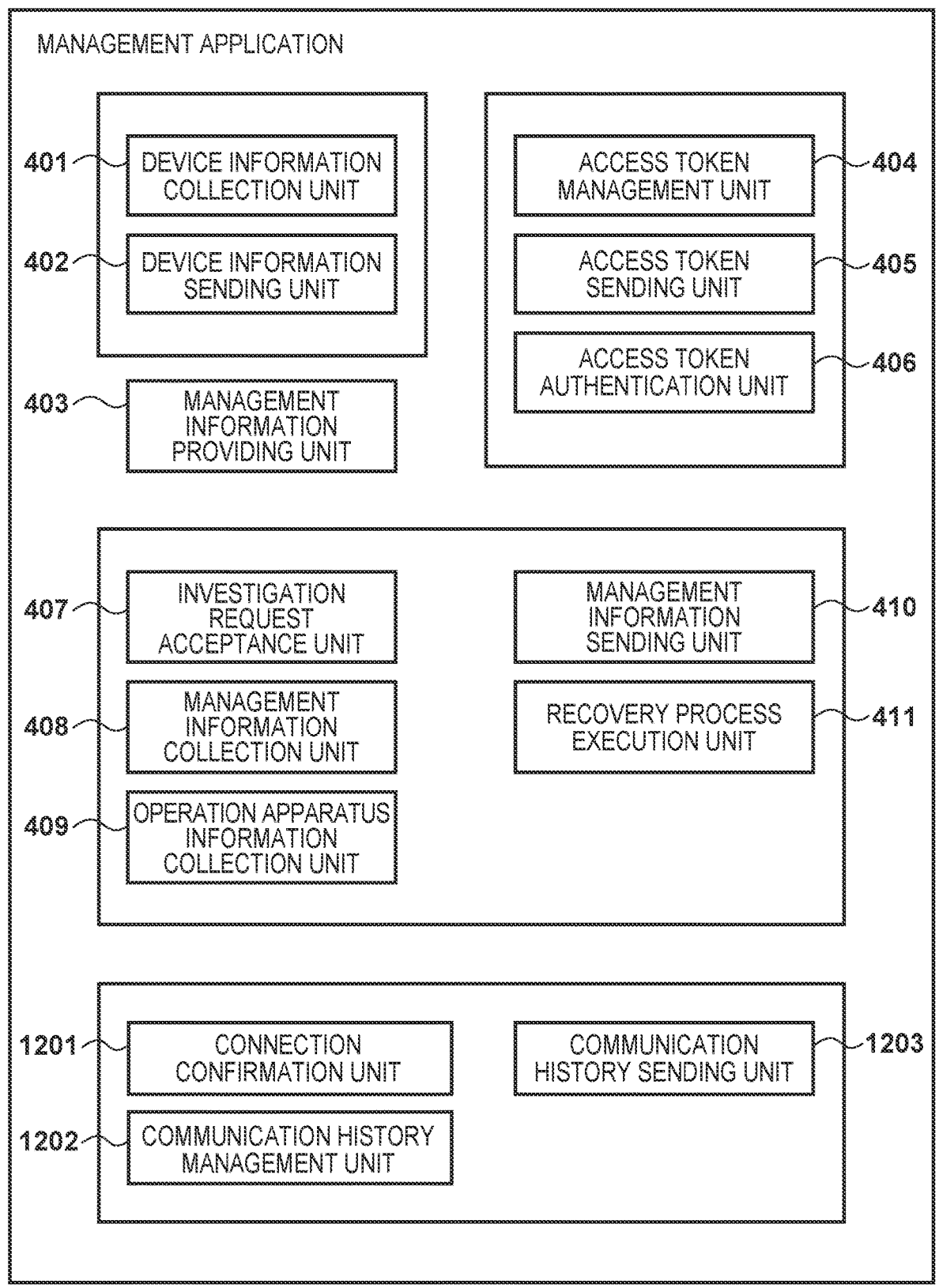
FIG. 12 is a block diagram showing an example of the software arrangement of a management application according to the third embodiment.

FIG. 12 shows an example of the software arrangement of a management application installed onto each image forming apparatus 102 or an information processing apparatus 103 according to the third embodiment. FIG. 12 is different from FIG. 4 in that a connection confirmation unit 1201, a communication history management unit 1202, and a communication history sending unit 1203 are added. The same reference numerals denote the same arrangement as in FIG. 4 described in the first embodiment, and a description thereof will be omitted.

The connection confirmation unit 1201 performs connection confirmation processing in order to determine whether it is possible to make network connection to another management application instructed from a device management server 101. As an example of the connection confirmation processing, there is a method of calling an API of another management application, a method of executing a PING command on the IP address of a management application, or the like. The device management server 101 instructs to make connection confirmations to a management application in the same tenant and further a management application of a limited setting.

The communication history management unit 1202 manages the result of a connection confirmation made by the connection confirmation unit 1201. The communication history sending unit 1203 sends, to the device management server 101, the result of a connection confirmation managed by the communication history management unit 1202. The connection confirmation unit 1201 may make connection confirmations with a management application periodically, for example, once a day. The communication history sending unit 1203 may send the result of a new connection confirmation to the device management server 101. In this case, an interval between connection confirmations by the connection confirmation unit 1201 is defined in advance and managed in the connection confirmation unit 1201.

(Device Management Server)

Figure 13:
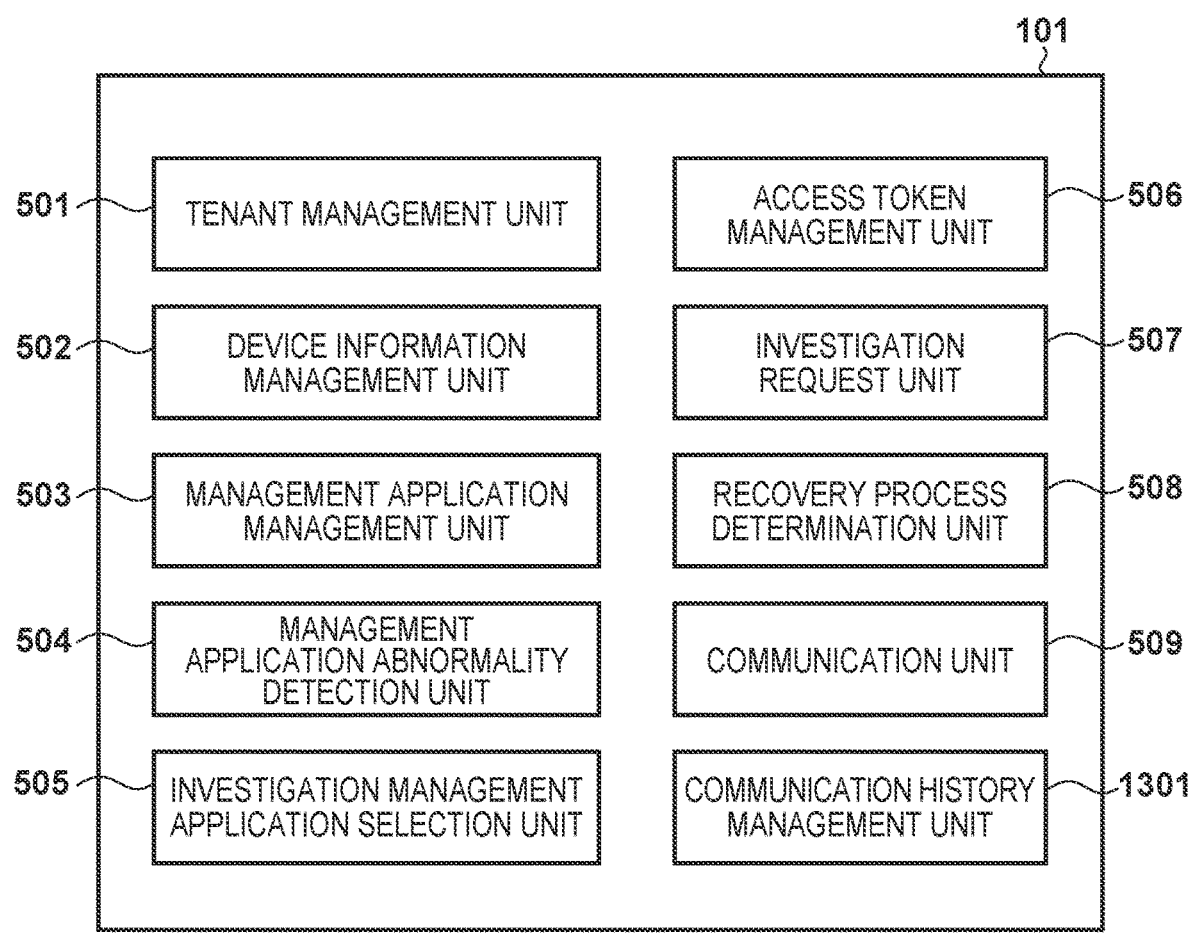
FIG. 13 is a block diagram showing an example of the software arrangement of a device management server according to the third embodiment.

FIG. 13 shows an example of the software arrangement of the device management server 101 according to the third embodiment. FIG. 13 is different from FIG. 5 in that a communication history management unit 1301 is added. The same reference numerals denote the same arrangement as in FIG. 5 described in the first embodiment, and a description thereof will be omitted.

The communication history management unit 1301 receives and stores a communication history between management applications sent from the communication history sending unit 1203 of the management application. In the investigation management application selection processing described above with reference to FIGS. 9A and 9B, an investigation management application selection unit 505 does not select, as an investigation management application, a management application without a communication history with a management application in an abnormal state in step S909. On the other hand, if a plurality of management applications remain as candidates for investigation management applications in step S909, an investigation request is sent to a management application having a new communication history.

As described above, considering the communication history between the management applications in the investigation management application selection processing, an investigation result of a management application originally incapable of network communication is excluded. This makes it possible, in this embodiment, to improve the authenticity of the investigation result, in addition to the effect in the first embodiment. It is also possible, by making the investigation request to the management application having the new communication history, to increase a probability of management information collection success.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-167288, filed Aug. 29, 2016, which is hereby incorporated by reference herein in its entirety.

What is claimed is:

1. A network system comprising a plurality of network devices, and a management system configured to manage information collected from the plurality of network devices,
wherein a management application executed by each of the plurality of network devices sends token information to the management system,
wherein the management system includes
a first memory storing first instructions; and
a first processor which is capable of executing the first instructions causing the management system to:
manage the plurality of network devices in association with each other for one management group;
receive token information from the managed network devices;
register the received token information in association with each of the managed network devices; and
when an abnormality in communication with a first network device out of the managed network devices is detected, send the registered token information that has been received from the first network device to a second network device managed in association with the same management group as the first network device;
wherein the second network device includes
a second memory storing second instructions; and
a second processor which is capable of executing the second instructions causing the second network device to:
try communication with the first network device by using the token information sent from the management system; and
send information regarding the communication to the management system.

2. The network system according to claim 1, wherein the management group is a tenant by a multi-tenant configuration.

3. The network system according to claim 1, wherein if communication between the management system and the network devices is not performed for a predetermined period, the management system detects the communication as the abnormality in the network devices.

4. The network system according to claim 1,
wherein the management application executed by the first network device provides data to the second network device in accordance with success in authentication by token information when accepting a data obtaining request containing the token information in the communication from the second network device, and
wherein the second instructions cause the second network device to send, to the management system, the data provided from the first network device as the information regarding the communication.

5. The network system according to claim 4, wherein the information regarding the communication contains at least one of setting information of the management application operating in the first network device in which the abnormality is detected, information regarding a collection status of log information by the management application, and information regarding a sending status of the log information by the management application.

6. The network system according to claim 4, wherein the information regarding the communication contains log information collected in the management application operating in the first network device in which the abnormality is detected.

7. The network system according to claim 1, wherein the information regarding the communication contains at least one of an activation state of the first network device in which the abnormality is detected and setting information of the first network device in which the abnormality is detected.

8. The network system according to claim 1, wherein the second instructions cause the second network device to send, to the management system, information on one of success and a failure when communication with the first network device is tried, as the information regarding the communication.

9. The network system according to claim 1, wherein the management application executed by each of the plurality of network devices periodically sends new token information to the management system so as to update the token information managed in the management system.

10. The network system according to claim 1, wherein the first instructions cause the management system to request that the second network device should reactivate one of the first network device and the management application executed by the first network device if an abnormality detected in the first network device satisfies a predetermined condition.

11. The network system according to claim 1, wherein the management application executed by each of the plurality of network devices further performs authentication processing in advance mutually with another management application belonging to the same management group and issues authentication information for the other management application that succeeds in the authentication processing, and wherein the management application executed by the first network device determines whether the second network device has been authenticated by using authentication information that has already been issued when accepting a data obtaining request in the communication from the second network device.

12. The network system according to claim 1, wherein the management application executed by each of the plurality of network devices further makes connection confirmations periodically on another management application belonging to the same management group and sends results to the management system;

wherein the first instructions cause the management system to manage results of the connection confirmations sent from the network device; and wherein in the management system, the second network device is selected, based on the results of the connection confirmations, among the plurality of network devices managed in the same management group as the first network as a network device to which the registered token information that has been received from the first network device should be sent.

13. A network device in a network system which includes a plurality of network devices and a management system managing information collected from the plurality of network devices, the network device comprising:
a memory storing instructions; and
a processor which is capable of executing the instructions causing the network device to: receive, from the management system, token information for another network device which is managed in the management system in the same management group as the network device; try communication with the another network device by using the received token information; and send information regarding the communication to the management system, wherein the token information is sent from a management application executed by the another network device to the management system, before a detection of an abnormality in the another network device by the management system.

14. A method of controlling a network device in a network system which includes a plurality of network devices and a management system managing information collected from the plurality of network devices, the method comprising:

receiving, from the management system, token information for another network device which is managed in the management system in the same management group as the network device;

trying communication with the another network device by using the received token information; and sending information regarding the communication to the management system, wherein the token information is sent from a management application executed by the another network device to the management system, before a detection of an abnormality in the another network device by the management system.

15. A non-transitory computer-readable medium that stores a program for causing a network device in a network system which includes a plurality of network devices and a management system managing information collected from the plurality of network devices to:

receive, from the management system, token information for another network device which is managed in the management system in the same management group as the network device;

try communication with the another network device by using the received token information; and send information regarding the communication to the management system, wherein the token information is sent from a management application executed by the another network device to the management system, before a detection of an abnormality in the another network device by the management system.

16. A device management method for a network system comprising a plurality of network devices, and a management system configured to manage information collected from the plurality of network devices, wherein a management application executed by each of the plurality of network devices sends token information to the management system, the device management method comprising:

managing, in the management system, the plurality of network devices in association with each other for one management group;

receiving, in the management system, token information from the managed network devices;

registering, in the management system, the received token information in association with each of the managed network devices; and in the management system, when an abnormality in communication with a first network device out of the managed network devices is detected, sending the registered token information that has been received from the first network device to a second network device managed in association with the same management group as the first network device;

trying, in the second network device, communication with the first network device by using the token information sent from the management system; and sending, in the second network device, information regarding the communication to the management system.

* * * * *